United States Patent
Aschauer et al.

(10) Patent No.: US 11,783,039 B2
(45) Date of Patent: Oct. 10, 2023

(54) METHOD FOR VERIFYING AN EXECUTION ENVIRONMENT USED FOR EXECUTION OF AT LEAST ONE HARDWARE-APPLICATION PROVIDED BY A CONFIGURABLE HARDWARE MODULE

(71) Applicant: SIEMENS AKTIENGESELLSCHAFT, Munich (DE)

(72) Inventors: Hans Aschauer, Munich (DE); Rainer Falk, Poing (DE); Christian Peter Feist, Munich (DE); Steffen Fries, Baldham (DE); Aliza Maftun, Munich (DE); Hermann Seuschek, Munich (DE); Thomas Zeschg, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 207 days.

(21) Appl. No.: 17/438,618

(22) PCT Filed: Feb. 25, 2020

(86) PCT No.: PCT/EP2020/054927
§ 371 (c)(1),
(2) Date: Sep. 13, 2021

(87) PCT Pub. No.: WO2020/182467
PCT Pub. Date: Sep. 17, 2020

(65) Prior Publication Data
US 2022/0188418 A1    Jun. 16, 2022

(30) Foreign Application Priority Data
Mar. 13, 2019   (EP) .................................... 19162488

(51) Int. Cl.
*G06F 21/57*    (2013.01)
*G06F 21/76*    (2013.01)

(52) U.S. Cl.
CPC .............. *G06F 21/57* (2013.01); *G06F 21/76* (2013.01); *G06F 2221/034* (2013.01)

(58) Field of Classification Search
CPC ..... G06F 21/57; G06F 21/76; G06F 2221/034
See application file for complete search history.

(56) References Cited

U.S. PATENT DOCUMENTS 8,166,477 B1 *   4/2012   Tormasov ........... G06F 9/45558
                                                        718/1
8,214,402 B2 *   7/2012   Bruno ................. G06F 9/45512
                                                        707/802

(Continued)

FOREIGN PATENT DOCUMENTS

CN    109039591 A    12/2018
WO    2017161305 A1   9/2017

OTHER PUBLICATIONS

European Search Report for European Application No. 19166079. 4-1204 dated Sep. 20, 2019.

(Continued)

*Primary Examiner* — Gary S Gracia
(74) *Attorney, Agent, or Firm* — Lempia Summerfield Katz LLC

(57) ABSTRACT

A method for verifying an execution environment provided by a configurable hardware module, where the execution environment is used for execution of at least one hardware-application, includes receiving a hardware-application 16. The hardware-application includes configuration data describing an instantiation as a hardware-application component on the configurable hardware module. A received hardware-application is instantiated as the hardware-application component in the execution environment. The execu- (Continued)

tion environment of the configurable hardware module that executes the hardware-application component in the respective execution environment is analyzed by an instantiated hardware-application component. The hardware application component communicates with a characterizing unit providing characterizing parameters for the execution environment of the configurable hardware module. The analyzed execution environment of the configurable hardware module is verified as admissible for execution of the hardware-application component if the analyzed execution environment matches the characterizing parameters provided by the characterizing unit.

15 Claims, 4 Drawing Sheets

(56) References Cited

U.S. PATENT DOCUMENTS

| | | | | |
|---|---|---|---|---|
| 8,850,396 | B2* | 9/2014 | Pasternak | G06F 11/3688 717/124 |
| 8,938,490 | B2* | 1/2015 | Norris | G06F 9/545 709/224 |
| 10,031,993 | B1* | 7/2018 | Poornachandran | H03K 19/17704 |
| 2010/0229168 | A1* | 9/2010 | Maeda | G06F 9/4856 718/1 |
| 2012/0227032 | A1* | 9/2012 | Zhang | G06F 9/44521 717/121 |
| 2014/0006711 | A1* | 1/2014 | Xing | G06F 12/10 711/E12.098 |
| 2015/0188707 | A1* | 7/2015 | Gehrer | H04L 9/3006 380/30 |
| 2015/0326543 | A1* | 11/2015 | Pochuev | H04W 12/04 713/155 |
| 2015/0363765 | A1* | 12/2015 | Alimi | G06Q 20/202 705/44 |
| 2018/0034793 | A1* | 2/2018 | Kibalo | G06F 21/575 |
| 2018/0082083 | A1* | 3/2018 | Smith | G06F 21/575 |
| 2018/0270068 | A1* | 9/2018 | Innis | H04L 63/105 |
| 2018/0288097 | A1* | 10/2018 | Poornachandran | G06F 21/55 |
| 2018/0293185 | A1* | 10/2018 | Vembu | G06F 9/5027 |
| 2018/0293701 | A1* | 10/2018 | Appu | G06F 9/5038 |
| 2019/0049912 | A1* | 2/2019 | Poornachandran | G06F 30/34 |
| 2019/0305927 | A1* | 10/2019 | Bhunia | H04L 9/0866 |
| 2020/0342068 | A1* | 10/2020 | Cai | G06F 30/20 |
| 2022/0164485 | A1* | 5/2022 | Zeschg | G06F 21/52 |
| 2022/0188418 | A1* | 6/2022 | Aschauer | G06F 21/57 |

OTHER PUBLICATIONS

PCT International Search Report and Written Opinion of International Searching Authority dated May 20, 2020 corresponding to PCT International Application No. PCT/EP2020/054927.

* cited by examiner

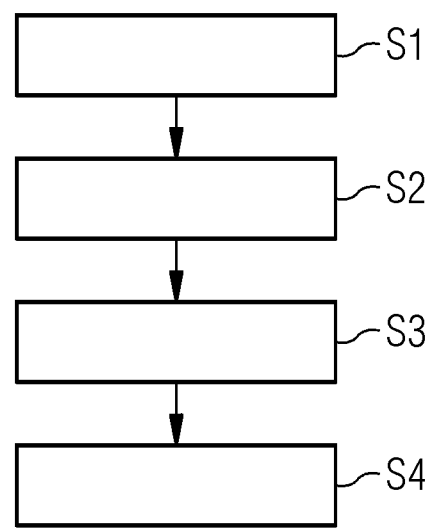

METHOD FOR VERIFYING AN EXECUTION ENVIRONMENT USED FOR EXECUTION OF AT LEAST ONE HARDWARE-APPLICATION PROVIDED BY A CONFIGURABLE HARDWARE MODULE

This application is the National Stage of International Application No. PCT/EP2020/054927, filed Feb. 25, 2020, which claims the benefit of European Patent Application No. EP 19162488.1, filed Mar. 13, 2019. The entire contents of these documents are hereby incorporated herein by reference.

BACKGROUND

The present embodiments relate to a method for verifying an execution environment used for execution of at least one hardware-application provided by a configurable hardware module.

Embedded devices, such as electronic control units (ECU), industrial personal computers (IPC), internet of things—(IoT) and edge devices are employed for various tasks in industrial processes, such as control and monitoring of technical processes as well as execution of safety-critical and of security-critical functions. The correct and unmanipulated functioning of the devices is vital as the devices are also used for monitoring and/or controlling critical processes (e.g., availability, reliability, real-time, and safety). Additionally, the growing trends for Industry 4.0 and industrial Internet scenarios have led to an increase in the networking of industrial devices for various purposes, such as monitoring, remote control, and analysis. The industrial devices become more prone to attacks with the increase in networked devices.

Since the industrial embedded devices serve for a long usage period (e.g., 10 to 20 years, sometimes 30 to 40 years) in field (e.g., industrial environment), the industrial embedded devices experience dynamically changing environments. This may lead to the requirement of developing flexible embedded devices that may cope up with the ever-changing environments. This may be achieved by employing an approach similar to smart phone applications that may be downloaded/installed/upgraded on runtime. In the future, a similar approach will be supported by the industrial devices.

Besides software-applications, hardware-application components may also be realized by using reconfigurable hardware. A hardware-application component makes use of partial reconfiguration features of, for example, field programmable gate arrays (FPGAs), FPGA system-on-a-chip (SoC), application-specific integrated circuit (ASIC) with embedded FPGA, and application-specific standard products (ASSP) with embedded FPGA. A hardware-application may be an independent stand-alone application, such as a hardware-application component, or the hardware-application may be part of a software-hardware application bundle.

FPGAs that leverage partial reconfiguration to reconfigure parts of the hardware on-the-go are available in the market, such as Intel Cyclone V, Intel Arria 10. On a partially reconfigurable FPGA, a hardware-application may be instantiated within a partial reconfiguration region of a reconfigurable hardware as a hardware-application component.

The integrity protection of a hardware-application execution environment is vital, especially if the hardware-application instantiated as a hardware-application component on a reconfigurable hardware performs security-critical functionalities, such as encryption/decryption, key management, or key agreement. The hardware-application environment includes an allowed set of interfaces, as well as surrounding logic. When the embedded device is in-field, there is the chance that the hardware-application component is compromised not only by hardware attacks such as hardware trojans, compromised hardware apps, side channel attacks, fault injection, IC depackaging, and delayering, but also by software attacks.

A common approach in the context of provisioning a secure environment and for validation of the environment is the usage of key blobs. The export of encrypted keys (e.g., key blobs) and the corresponding binding to a hardware instance is known (e.g., as provided by the i.MX6 processor series or trusted platform module (TPM)). The i.MX6 crypto-co-processor allows that when a key blob is generated, a value (e.g., key modifier) selected by the manufacturer may also be loaded into the crypto-module. In this way, a binding between the key blob and the key modifier is generated.

Physically unclonable functions (PUFs) are known. Small fluctuations in the semiconductor manufacturing process provide minimal differences in electrical behavior in otherwise identical chips. This includes hardware where each sample behaves differently. This may be advantageous if this different behavior occurs again and again in the same way for each hardware copy. A PUF may be used as a fingerprint to uniquely identify a chip or to create a cryptographic key. PUFs therefore are digital/mixed-signal circuits that amplify the behavior to generate chip-specific identifier (e.g., authentication of hardware) and/or keys (PUF based key derivation). For example, a robust key derivation is associated with a characterization phase as well as the creation and storage of helper files.

Additionally, tamper detection with sensors mounted on or integrated into chips (e.g., temperature, voltage, clock frequency, light, radiation) is known. The sensors verify the physical characteristics that are required for a correct functionality. Therefore, attacks (e.g., fault-injection) may be identified, and countermeasures may be implemented (e.g., providing a tamper-event for a software and setting a switch signal, deleting of a cryptographic key). This mechanism is used, for example, in a secure non-volatile storage (SNVS) component of the i-MX6 processor series.

In addition, wire meshes are known. A wire mesh is a structure including fine conducting signal line (e.g., as part of the top layer of a chip). A break through of this layer (e.g., by invasive attacks) may be detected. Further methods based on capacitive and resistive changes are known.

These approaches do not provide the functionality of verifying the execution environment of a configurable hardware module that executes an instantiated hardware-application component. Solely, an identification of the hardware based on a hard-coded identifier or a serial number of the chip is possible.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a solution that verifies an execution environment provided by a configurable hardware module by a hardware-application component to provide security-critical functionalities only in a safe environment is provided.

The present embodiments provide, according to a first aspect, a method for verifying an execution environment provided by a configurable hardware module. The execution environment in the configurable hardware module is used for execution of at least one hardware-application. The method includes receiving, by the configurable hardware module, the hardware-application. The hardware-application includes configuration data describing an instantiation as a hardware-application component on the configurable hardware module. A received hardware-application is instantiated as the hardware-application component in the execution environment of the configurable hardware module. The method also includes analyzing, by the instantiated hardware-application component, the execution environment of the configurable hardware module that executes the hardware-application component in the respective execution environment. The hardware application component communicates with a characterizing unit providing characterizing parameters for the execution environment of the configurable hardware module. The analyzed execution environment of the configurable hardware module is verified as admissible for execution of the hardware-application component if the analyzed execution environment matches the characterizing parameters provided by the characterizing unit.

In connection with the present embodiments, "hardware application" may be, for example, a component (e.g., a description of a digital logic component, such as a netlist of bitstreams). The description of the digital logic component is written, for example, in Very High Speed Integrated Circuit Hardware Description Language (VHDL) or in Verilog HDL and instantiated, after processing (e.g., synthesis, place, and route) on a configurable hardware component (e.g., an FPGA). The configuration data of the hardware application describes the layout of the hardware application component that may be instantiated in hardware on the configurable hardware module (e.g., by configuring either the entire configurable hardware module or at least one dynamically reconfigurable portion available on a configurable hardware module). Therefore, the hardware application describes a configuration of, for example, a digital circuit that may be uploaded in the execution environment of the configurable hardware module.

A hardware application component is an instantiated and executed hardware application. The configurable hardware component may include a plurality of reconfigurable parts that are described by a configuration specification. The configuration specification includes, for example, a floor plan that describes which parts of the reconfigurable hardware component are reconfigurable at runtime. This has the advantage that at runtime hardware applications including, for example, different and/or other hardware functionality may be uploaded on the reconfigurable hardware module, without affecting the remaining logic that is instantiated on the reconfigurable hardware module.

An advantage of the method for verifying an execution environment provided by a configurable hardware module is that a hardware-application component may verify whether the hardware-application component is executed on the same hardware configuration module as when the hardware-application component was executed in a previous instantiation, or whether the hardware-application component is still running in a specific part (e.g., partial reconfiguration region) of the hardware configuration module. The result of the verification may be used for protection of security-critical functions realized by the hardware-application component.

In one embodiment, the mechanism of the hardware-application component is combined with methods for characterizing physical characteristics of a chip (e.g., an FPGA). This allows a hardware-application component to be bound to a specific physical chip-design and/or a specific physical chip instance.

Further, a software-application component that uses an allocated hardware-application component according to the present embodiments may directly bind to the used physical hardware. The hardware-application component may realize specific functionalities that are required for execution of the software-application component. In one embodiment, an unauthorized copying of the software and/or hardware-application component may be prevented.

Further, it is advantageous that the verification of the execution environment increases the security of hardware-application components as well as the robustness against modelling attacks.

In addition, the present embodiments are beneficial, for example, in case to protect the integrity of the hardware-application components when the embedded devices are deployed in the industrial environment. The embedded devices are better protected from harmful use by an attacker while still providing a high degree of flexibility.

The present embodiments further provide, according to a second aspect, an apparatus for verifying an execution environment provided by a configurable hardware module. The execution environment in the configurable hardware module is used for execution of at least one hardware-application. The apparatus includes a processing unit that is configured to provide the hardware-application. The hardware-application includes configuration data describing the instantiation as a hardware-application component on the configurable hardware module. The processing unit is further configured to instantiate a provided hardware-application as the hardware-application component in the execution environment of the configurable hardware module. The processing unit is further configured to receive a result from the analysis of the execution environment of the configurable hardware module that executes the hardware-application component processed by an instantiated hardware-application component. The hardware-application component is in communication with a characterizing unit providing characterizing parameters for the execution environment of the configurable hardware module. The processing unit is further configured to verify the analyzed execution environment of the configurable hardware module as admissible for execution of the hardware-application component based on a received result if the analyzed execution environment matches the characterizing parameters provided by the characterizing unit.

The method according to the first aspect may also be implemented as a computer program product with a microprocessor computer program, whereby the computer is prompted to perform the method described above when the computer program is executed on the computer or on a processor of the computer. An alternative solution is to run a computer program with computer program code to perform all the acts of the method described above and/or below when the computer program runs on the computer. The computer program may also be stored on a machine-readable storage medium. An alternative solution is to store the computer-implemented method as described above on a storage medium that is readable by a computer or processor. The computer program product may be executed by a processing unit realized by the hardware-application.

Not all acts of the procedure necessarily have to be performed on the same component or computer instance, but may also be performed on different computer instances. Not all acts of the procedure necessarily have to be performed on the same integrated circuit or on the same die of a multi-chip module, but may also be performed on different integrated circuits or on different dies.

In a possible embodiment of the method according to the first aspect of the present embodiments, the hardware-application component changes into a hardware operation mode if the analyzed execution environment does not match the characterizing parameters provided by the characterizing unit. The hardware operation mode of the hardware-application component encompasses an error modus and/or debugging modus.

In this way, an interactive user or software-application communicating with the hardware-application component or another hardware component may be alarmed, and the hardware-application component remains in a well-defined state and may, for example, be evaluated by the hardware-application component developer. Alternatively, the hardware-application component may store the state in a register, which further hardware logic or software applications are able to query.

Thus, the security-critical functionalities realized by a hardware app are protected. In the debugging modus, the hardware-application developer may check the hardware-application component in a step-by-step procedure to find the reason for changing the hardware operation mode.

In a further possible embodiment of the method according to the first aspect, the hardware-application component changes into a hardware operation mode if the analyzed execution environment does not match the characterizing parameters provided by the characterizing unit. The operation mode of the hardware-application component includes a limiting set of its functionality.

In this way, the application-hardware component is further running but with limited functionalities that, for example, do not provide security-critical functionalities (e.g., key storage, encryption and decryption algorithms, signature algorithms). Thus, the security-critical functionalities are protected. The security-critical functionalities should not be released until the hardware or the region for execution is not verified.

In a further possible embodiment of the method according to the first aspect, the hardware-application component changes into a hardware operation mode if the analyzed execution environment does not match the characterizing parameters provided by the characterizing unit. The operation mode of the hardware-application component includes the deactivation of functionality of the hardware-application component.

In this way, the hardware-application component and, for example, security-critical functionalities of the hardware-application component are stopped and are no longer available. This reduces the risk of confidential information, such as cryptographic keys, becoming comprised.

In a still further possible embodiment of the method according to the first aspect of the present embodiments, the hardware-application component changes into a hardware operation mode if the analyzed execution environment does not match the characterizing parameters provided by the characterizing unit. The operation mode of the hardware-application component includes the repetition of verifying the analyzed execution environment.

In this way, an error during the verification may be excluded, and the method is more robust against physical disturbances that may result in noise in the characterizing parameters provided by a characterizing unit. For example, if the result of the verification is not admissible, the comparison of the analyzed execution environment with the characterizing parameters may be repeated five times, and if, for example, three out of five verification attempts include a match as result, then it may be assumed that the hardware-application component is executed on the correct configurable hardware module and/or correct partial reconfiguration region of the configurable hardware module.

In a still further possible embodiment of the method according to the first aspect, the verification may be executed for each action of the hardware-application component.

In a still further possible embodiment of the method according to the first aspect, the execution environment of the configurable hardware module includes a reconfiguration region (RR) of the configurable hardware module and/or at least one partial reconfiguration region (PRR) of the reconfiguration region (RR) of the configurable hardware module.

Due to the possibility to reconfigure regions of the configurable hardware module or to partial reconfigure regions of the reconfiguration region, it is possible to use hardware in a more flexible way and to adapt the hardware according to changing demands and requirements. It is possible to reconfigure the configurable hardware module at runtime (e.g., changing the functionality of a portion of the configurable hardware while the remaining logic remains operational).

In a still further possible embodiment of the method according to the first aspect, the configurable hardware module includes a field programmable gate array (FPGA), an application specific integrated circuit (ASIC), or an application specific standard product (ASSP).

In a still further possible embodiment of the method according to the first aspect, the characterizing unit includes a physical unclonable function (PUF).

In this way, the PUF-logic may be implemented as a measurement unit providing characteristic parameters. The characteristic parameter allows to characterize and/or to identify a configurable hardware module (e.g., hardware chip, FPGA) and/or a region into the hardware chip. The PUF may be implemented as a global PUF and a local PUF. The global PUF characterizes the entire hardware chip (e.g., the FPGA) and may be used to identify the specific chip or the specific hardware. The local PUF characterizes the behavior of a specific region on the chip and/or hardware and may be used to identify a specific region of the configurable hardware module that executes a hardware-application component.

In one embodiment, a PUF does not need an error correction if the characterizing unit parameter is matched to a certain configurable degree (e.g., at maximum 5% deviation from the reference parameter). This enables an easy implementation and use of the method to verify the execution environment of a configurable hardware module.

In a still further possible embodiment of the method according to the first aspect, the characterizing unit includes a ring oscillator (RO).

A ring oscillator is a device composed of an odd number of "NOT" gates (e.g., inventers) in a ring having an output that oscillates between two voltage levels, representing true and false. The ring oscillator generates a frequency that is different for each hardware (e.g., chip, die or placement on the same chip/die). The frequency may be measured, and the characterized hardware may be identified. The oscillator may be used in combination with a counter. This may increase the robustness of the verification process.

In a still further possible embodiment of the method according to the first aspect of the present embodiments, the characterizing unit includes a ring oscillator-physical unclonable function (RO-PUF).

Through this construction, the robustness towards physical perturbations is increased, the number of logic elements needed for realization in hardware is low, and therefore the consumption of resources of the configurable hardware module is reduced.

In a still further possible embodiment of the method according to the first aspect of the present embodiments, the characterizing unit includes characterizing parameters specifying the reconfiguration region (RR) of the configurable hardware module.

The reconfiguration region describes the region of the configurable hardware module (e.g., a SoC with integrated FPGA) that may be configured and re-configured by transferring a configuration description (e.g., hardware-application). The transferred configuration description is further used in an embodiment with a software application and configuration settings. The reconfiguration region is also partially configurable.

If a circuit design is implemented in VHDL and executed on a hardware (e.g., on an FPGA), this circuit design has the same switching behavior from the clock point of view as a second circuit with the same design. However, due to process fluctuations during the manufacturing process of the configurable hardware module, the transistors of the configurable hardware module have, for example, different threshold voltages (e.g., if two different chips, or two different regions of the same chip, implemented the same circuit design). This results in different timing behavior describing different characteristics of the configurable hardware module (e.g., the reconfiguration region of the configurable hardware module), which may be determined.

A PUF extracts the different characterizing parameters and amplifies the different characterizing parameters so that the different characterizing parameters may be measured. Therefore, the minimal differences in the manufacturing process may be used to generate configurable hardware module specific and unique identifiers or keys. These specific identifiers or keys characterize the configurable hardware module (e.g., the reconfiguration region of the configurable hardware module or a partial reconfiguration region of the configurable hardware module).

In a still further possible embodiment of the method according to the first aspect, the characterizing unit is included in the configurable hardware module. In this embodiment, the characterizing unit is in communication with each instantiated hardware-application component.

In this way, the characterizing unit (e.g., a PUF) may be implemented as a global PUF that characterizes the configurable hardware module (e.g., the FPGA chip). Therefore, the FPGA chip having an execution environment that executes the hardware-application component may be identified. If a hardware-application component including the identical logic is executed on a second FPGA different to the first FPGA, the PUF would provide different results specific for the second FPGA.

In an embodiment, the hardware-application component includes an evaluation unit to evaluate the characterizing data provided by the global PUF. In this way, the evaluation unit may determine if the data provided match the expected results when executed on the FPGA. If the data matches the expected results, the use of security-critical functionalities may be approved because the hardware-application component has verified an execution environment of the hardware-application component as trustworthy and admissible. If the data does not match the expected results or the comparison fails, the use of security-critical functionalities may be prohibited. Alternatively, only functionalities for the identified hardware are activated or unlocked.

In a still further possible embodiment of the method according to the first aspect, the characterizing unit includes characterizing parameters specifying at least one partial reconfiguration region PRR of the reconfiguration region RR of the configurable hardware module.

The partial reconfiguration region describes a region in the reconfiguration region of the configurable hardware module that may be configured and reconfigured by transferring a configuration description (e.g., a hardware-application). In an embodiment, the transferred configuration description also includes a software application and configuration settings. There may be different kinds of software applications. At first, a hardware application may include a processor allowing to execute software and a second where a processor independent from the hardware application may communicate with the hardware application.

Each partial reconfiguration region uses different transistors of the configurable hardware module (e.g., of the FPGA) to instantiate a hardware-application component in an execution environment of the hardware-application component. If two identical hardware-applications are instantiated in different partial reconfiguration regions, different transistors are used because the instantiated hardware-application component is executed in different regions of the FPGA. This may lead into different characterizing parameters (e.g., timing and delay behavior that may be evaluated).

In a still further possible embodiment of the method according to the first aspect, the characterizing unit is included in the hardware-application component.

In this way, the characterizing unit is provided by the hardware-application and included in the hardware-application component. In this way, the hardware-application component may verify an execution environment of the hardware-application component (e.g., the partial reconfiguration region that executes the hardware-application component). Further, if the PUF is realized and provided by the hardware-application, it may be assumed that the PUF has not been compromised by attacks and works as defined.

In an alternative embodiment, each instantiated hardware-application component is in communication with a separate characterizing unit. Therefore, each partial reconfiguration region is in communication with a separate characterizing unit, and the configurable hardware module includes a plurality of characterizing units according to the number of instantiated hardware-application units.

In this way, local PUFs are provided and in communication with each execution environment (e.g., region) of the instantiated hardware-application components. Therefore, each region may get its local PUF from the outside provided to the hardware-application. The hardware-application component may identify and verify its execution environment.

In a still further possible embodiment of the method according to the first aspect, the characterizing parameter is verified using the hamming-distance of changing bits.

In this way, the number of changing bits of the PUF-response according to a reference value may be evaluated. The hamming distance, for example, between two strings of equal length is the number of positions at which corresponding symbols are different. The hamming distance measures the minimum number of substitutions required to change one string into the other, or the minimum number of errors that may have transformed one string into the other.

As an example, the PUF may be 32 Bits. The hamming-distance may be evaluated and compared with an expected reference value, and if the hamming distance deviates in a range of, e.g. 1% to 10%, 3% to 7% or for a value of less than 5% from the expected reference value, the execution environment for the hardware-application component may be, for example, verified as admissible; additionally, it may be assumed that the hardware-application component is executed in the expected execution environment. The ranges and value described above do not represent a restriction for the present embodiments. Rather, further ranges and values for the hamming distance that may be used to verify the execution environment may be provided.

The reference value may be generated within the first execution of the instantiated hardware-application component by reading out the PUF.

In a still further possible embodiment of the method according to the first aspect of the present embodiments, the characterizing parameter includes a reference-value including bits with a defined stable or instable state.

In this way, the PUF is characterized during determination of the reference value. The reference value includes the number of bits that are stable logical "1" and "0". Further, the reference value defines which bits have the stable logical state "1" or "0" and which are instable. A deviation from the reference value may indicate an inadmissible execution environment.

In a still further possible embodiment of the method according to the first aspect, the reference-value is encrypted.

In a still further possible embodiment of the method according to the first aspect, the reference-value is signed with a hardware-application component specific key by the hardware-application component. A cryptographic message authentication code or an asymmetric digital signature may be used as a signature.

In this way, the generated reference value may be encrypted or signed by the hardware-application component with a hardware-application component specific key. The encrypted or signed reference value may be persisted in a storage device.

In a still further possible embodiment of the method according to the first aspect of the present embodiments, the characterizing parameters are used to generate and verify a challenge-response-list.

In this way, the hardware-application component may generate a local challenge-response-list to verify and identify by execution an execution environment of the hardware-application component.

The challenge-response-list is known from the challenge-response-authentication that is a secure authentication procedure based on knowledge. A first participant presents a question "challenge", and another participant is to provide a valid answer "response" to be authenticated. Therefore, the response from different hardware to the same challenge may be used to identify the hardware because the response will be different for each hardware.

The challenge-response-list may be generated (e.g., provisioning phase) within the first execution of the hardware-application component. In this time, the PUF is to be evaluated. A corresponding provisioning phase may be finished with setting of certain fuses or an external signal. Fuses may be burned only once, and therefore, the reference value is fixed.

Alternatively, the challenge-response-list may be provided within the hardware-application.

In a still further possible embodiment of the method according to the first aspect, the characterizing parameter includes an encrypted key generated by the hardware-application component.

In this way, the hardware-application component may by itself provide generated secrets (e.g., cryptographic keys) and hardware module and execution environment bounded export (e.g., in a key blob). Thereby, for example, as a part of the key blob generation, the response of a PUF (global/local) may be integrated into the exported data structure and thus serves as a reference value. The key blob may be checked by the hardware-application component, depending on the variant, whether it is running on a current configurable hardware module (e.g., global), or in a current partial reconfiguration region (e.g., local). If this is not the case, the hardware-application component may refuse to decrypt or to use the key blob. This is advantageous over the typical use of PUFs for key storage, that neither helper data nor multiple challenges need to be used. This improves the usability and complicates modelling attacks on the PUF.

Further, the present embodiments may be used to detect changes in the execution environment (e.g., strong increase in temperature). Security-critical functions of a hardware-application components (e.g., importing of key blobs would then only work under defined conditions). When an embedded device, for example, overheats, the PUF response may change significantly. This change may indicate a critical situation (e.g., a manipulation) where security-critical functionality should no longer be provided.

The above embodiments are not mutually exclusive and may be used in any appropriate combination.

BRIEF DESCRIPTION OF THE DRAWINGS

FIG. 4 shows a flowchart of a possible exemplary embodiment of a method for verifying an execution environment provided by a configurable hardware module.

DETAILED DESCRIPTION

Figure 1:
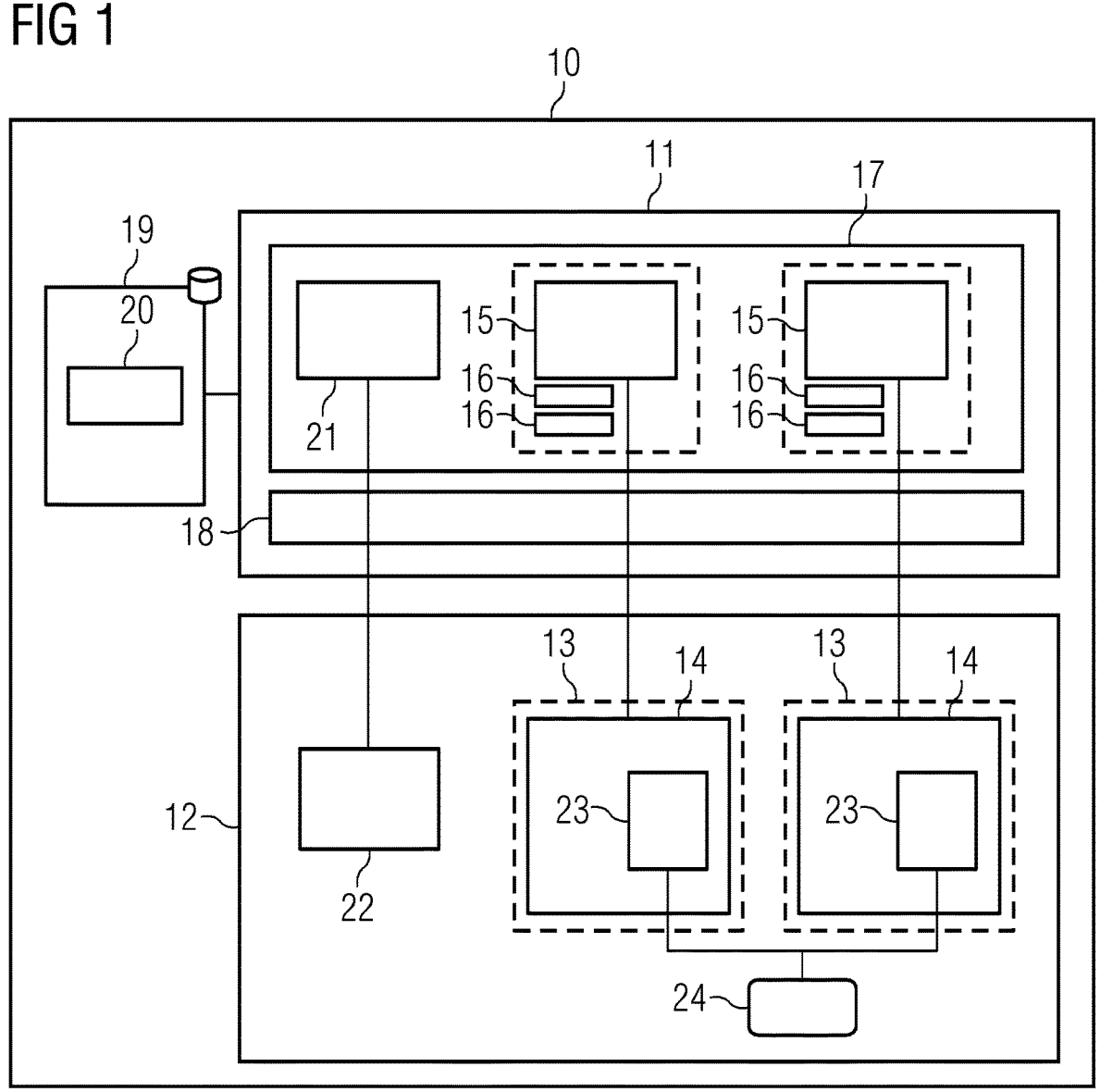
FIG. 1 shows a schematic diagram of a first specific example for illustration of a PUF-based verification of an execution environment.

In the following description, various aspects of the present invention and embodiments thereof will be described. However, it will be understood by those skilled in the art that embodiments may be practiced with only some or all aspects thereof. For purposes of explanation, specific numbers and configurations are set forth in order to provide a thorough understanding. However, it will also be apparent to those skilled in the art that the embodiments may be practiced without these specific details. Like reference numerals refer to like elements or elements having a similar function throughout the following description.

FIG. 1 shows schematically a first specific example illustrating the PUF-based verification of the execution environment according to the present embodiments. In the illustrated exemplary embodiment, an embedded device 10 (e.g., an industrial device) may include a configurable hardware module 12, such as an FPGA and a central processing unit 11 (CPU). The FPGA and CPU are provided as separate components. In an alternative embodiment, the CPU and a storage unit may be implemented by a system-on-chip design, where the components are realized on a single chip. In a further alternative embodiment, the configurable hardware module 12 is provided by a reconfigurable ASIC, or by an ASIC that includes an embedded FPGA. Therefore, the software application may deploy hardware-applications to hardware to either use the hardware in a more flexible manner or simply re-use the resources available in a more efficient way.

Due to the changing industrial environments, the use of dynamically reconfigurable modules 12 in embedded devices 10 is gaining rise. In the context of partially reconfigurable FPGAs, the hardware-application 16 are instantiated within partially reconfigurable regions (PRRs), and a corresponding execution environment 13 consists of the PRR configurations and the surrounding logic that the hardware-application may communicate with. When an application bundle is transferred to an embedded device 10, the application bundle consists of a software application 15, one or more hardware-applications 16, and a manifest including the PRR interface configuration settings. The application bundle is transferred with integrity protection and the possibility of verifying the authenticity of the bundle. This may be achieved, for example, by digitally signing the application bundle and enables the detection of manipulation during the transfer. The integrity and authenticity are verified before installation.

A trustworthy software component (e.g., a reconfiguration and update manager 21 (RUM)) assigns a PRR region to each hardware-application and manages the corresponding user- and kernel space settings. An operation system/kernel component 18 forms the interface between the hardware-application component 14 and the user space 17 and corresponding software application 15 and includes the drivers for the operation system. The operation system provides the software runtime environment.

On the configurable hardware module 12 side, a corresponding hardware module 22 implements the partial reconfiguration logic (PR-logic). The PR-logic 22 takes over the reconfiguration process and locks the PPRs to the assigned hardware-application 16. The PR-logic 22 in combination with the drivers in the kernel component 18 provides that each PRR may be configured by the assigned software component only. Additionally, the PR-logic 22 in combination with the drivers in the kernel component 18 provides that during the PRR reconfiguration with the appropriate hardware-application 16 (e.g., distinct as a partial bitstream (PB)), any corresponding interface-settings required by the hardware-application components are also put in-place.

The non-volatile memory unit 19 stores all information that is to be provided to boot the embedded device 10. The information includes the bootloader, the operating system, the hardware/software application packages 20, as well as other software packages part of the software runtime environment.

In connection with the present embodiments, a software application 15 and the hardware-application 16 (e.g., a partial bitstream) may be uploaded in the execution environment 13 (e.g., a partial reconfigurable region). The partial bitstream may be used to configure the partial region and to instantiate a hardware-application component 14 in this execution environment 13 so that the software-application 15 may use this region for further processing. The partial bitstream specifies how the execution environment 13 as well as the instantiated hardware-application component 14 will be configured.

In FIG. 1, two hardware-application components 14 that are instantiated in two execution environments 13 are exemplarily shown. The number of hardware-application components 14 as well as of executions environments 13 on the configurable hardware module 12 is not limited to the number as shown in FIG. 1. In one embodiment, further partial reconfigurable regions and hardware-application components 14 may be generated and instantiated.

The instantiated hardware-application component 14 may verify and identify the execution environment 13 where the hardware-application component 14 is instantiated and therefore verify the hardware (FPGA) and/or the region of the hardware that executes the hardware-application component 14. The verification of the execution environment 13 is carried out using the hardware specific characteristics (e.g., provided by a characterizing unit 24, such as PUFs).

The hardware-application components 14 as shown in FIG. 1 use the same characterizing unit 24 (e.g., a global PUF provided by the static FPGA-logic to verify the execution environment 13 that executes the hardware-application component 14). If the hardware-application component 14 is instantiated on a different configurable hardware module 12, the result of the evaluation of the data provided by the global PUF would be significantly different. A difference or deviation indicates that the hardware-application component 14 is not executed in the execution environment 13 as expected.

The data of the global PUF is evaluated by the evaluation component 23 that is in communication with the global PUF. The evaluation unit 23 verifies whether the result of the global PUF matches the expected result, when the hardware-application component is executed on this configurable hardware module. Therefore, the hardware-application component is able to find out, by evaluating the result, on which configurable hardware module 12 the hardware-application component 14 it is executed. In case of using the correct execution environment, security-critical functions may be activated or kept inaccessible. If the execution in the execution environment is not admissible, the security-critical functions may be deactivated, or the hardware-application component 14 enables a different spectrum of functionalities defined for the execution environment 13 that executes the hardware-application component 14.

Figure 2:
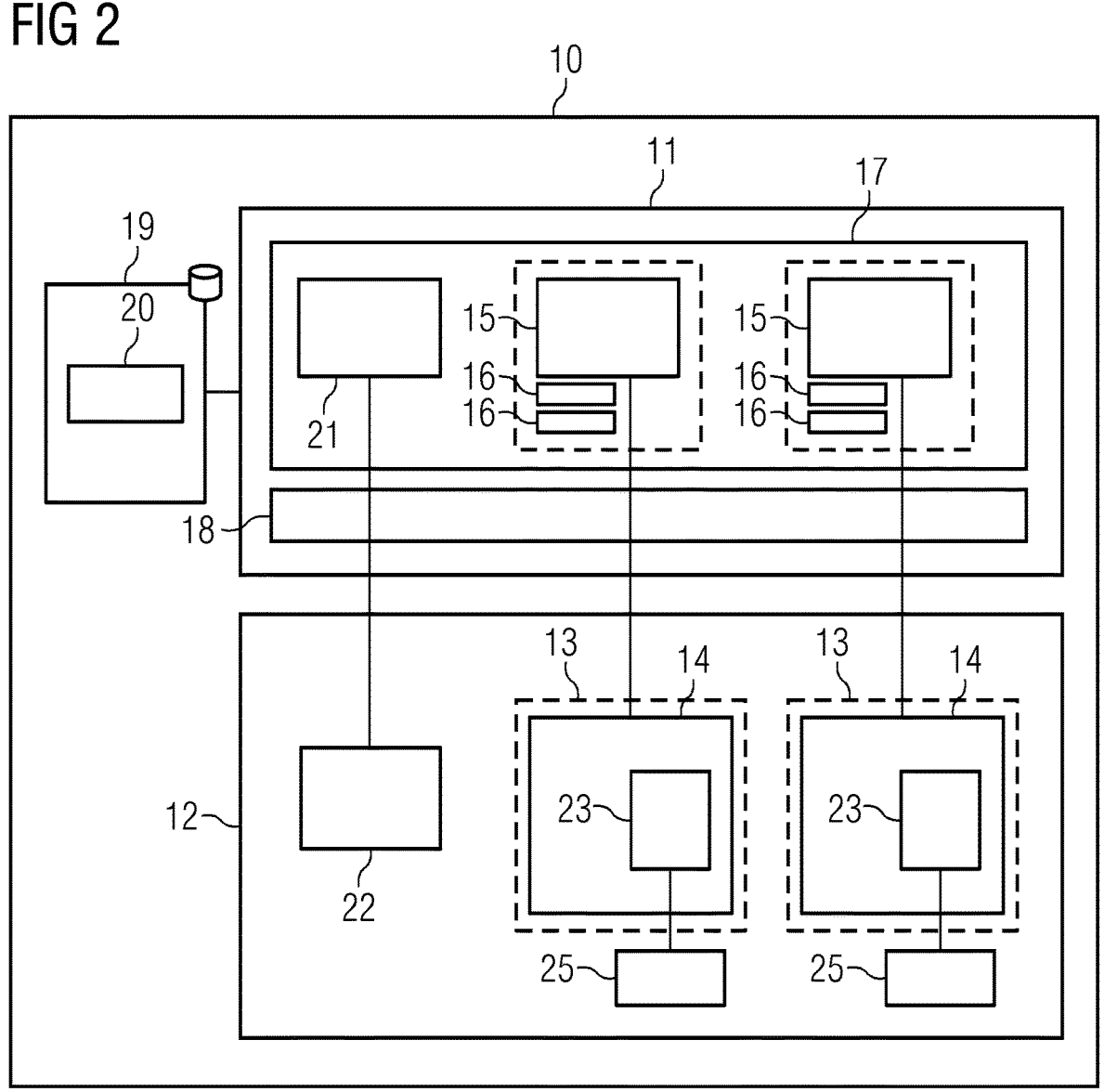
FIG. 2 shows a schematic diagram of a second specific example for illustration of the PUF-based verification of the execution environment.

FIG. 2 shows schematically a second specific example illustrating the PUF-based verification of the execution environment according to the present embodiments.

In FIG. 2, each hardware-application component 14 uses a single characterizing unit 25 (e.g., a local PUF provided by the static FPGA-logic) to verify the execution environment 13 that executes the hardware-application component 14. A local PUF is provided for, and therefore local to, each execution environment 13 (e.g., for each partial reconfiguration region). If the hardware-application component 14 is instantiated on a different configurable hardware module 12, the result of the evaluation of the data provided by the global PUF would be significantly different. A difference or deviation indicates that the hardware-application component 14 is not executed in the execution environment 13 as expected. Further, the use of a local PUF allows a hardware-application component to detect whether the hardware-application component is instantiated in a different execution environment 13 on the same configurable hardware module 12.

The data of the global PUF is evaluated by the evaluation component 23 that is in communication with the local PUF. The evaluation unit 23 verifies whether the result of the local PUF matches the expected result, when the hardware-application component 14 is executed on this configurable hardware module 12. Therefore, the hardware-application component 14 is able to find out, by evaluating the result, on which configurable hardware module 12 the hardware-application component 14 is executed. In case of using the correct execution environment, security-critical functions may be activated or kept unlocked. Further, the use of a local PUF allows a hardware-application component to detect whether the hardware-application component is instantiated in a different execution environment 13 on the same configurable hardware module 12.

Figure 3:
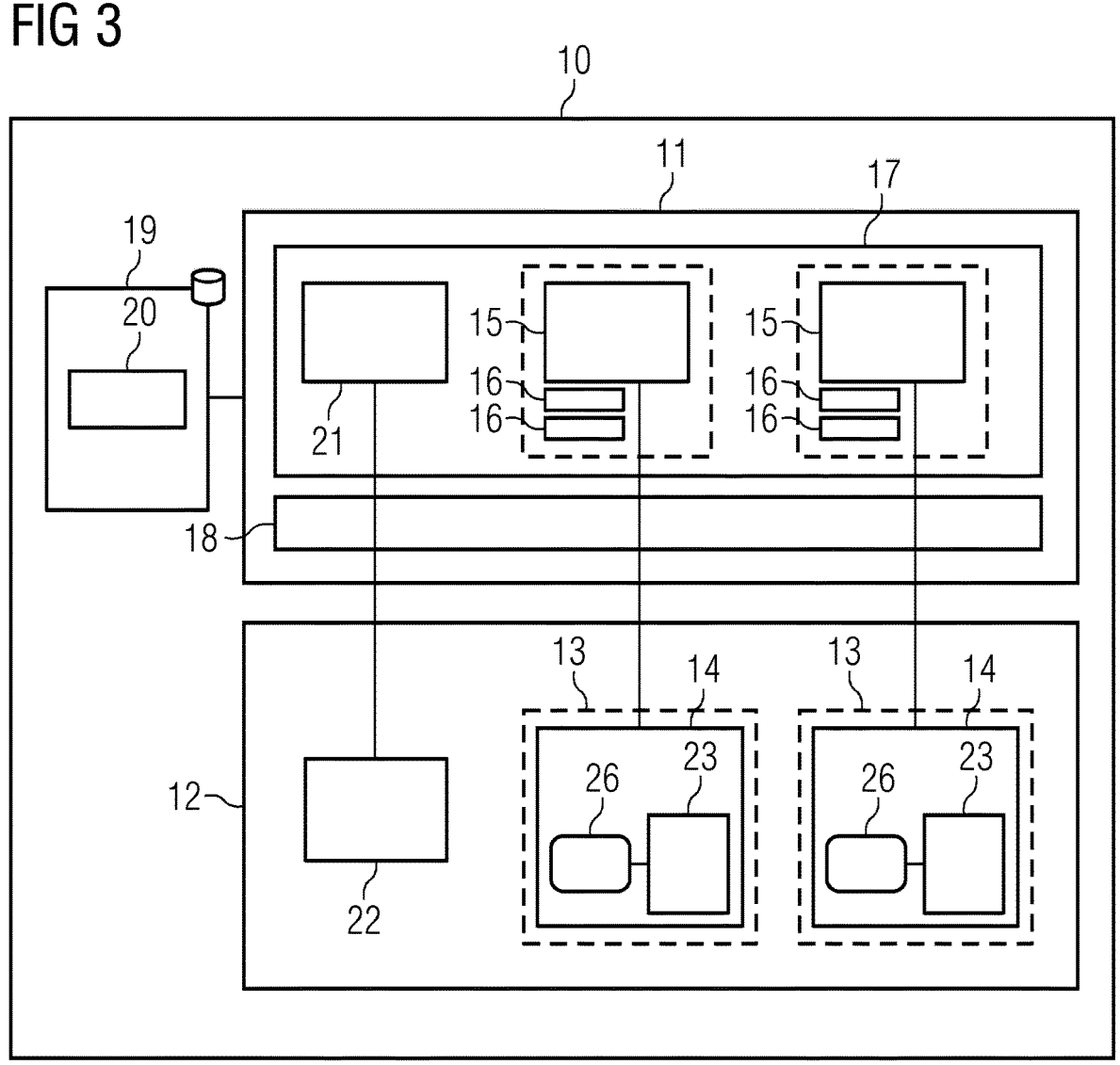
FIG. 3 shows a schematic diagram of a third specific example for illustration of the PUF-based verification of the execution environment.

FIG. 3 shows schematically a third specific example illustrating the PUF-based verification of the execution environment according to the present embodiments.

In FIG. 3, each hardware-application component 14 includes its own characterizing unit 26 (e.g., a local PUF). In contrast to the schematic diagram in FIG. 2, the characterizing unit 26 is provided by the hardware-application 16. The characterizing unit 26 is in communication with the evaluation component 23 of each hardware-application component 14. In this embodiment, the hardware-application component 14 is able to verify and identify the execution environment 13 (e.g., the partial reconfiguration region of a reconfiguration region that executes the hardware-application component 14). If the hardware-application component 14 is instantiated on a different FPGA or in another partial reconfiguration region of the same FPGA, the result of the evaluation of the PUF will be different, and therefore, the verification of the execution environment 13 will be inadmissible for execution of the hardware-application component 14.

FIG. 4 shows a flowchart of a possible exemplary embodiment of a method for verifying an execution environment provided by a configurable hardware module.

The method includes in the illustrated exemplary embodiment a number of main acts. In a first act S1, a hardware-application 16 is received by the configurable hardware module 12, where the hardware-application 16 includes configuration data describing an instantiation as a hardware-application component 14 on the configurable hardware module 12.

In a further act S2, the received hardware-application 16 is instantiated as the hardware-application component 14 in the execution environment 13 of the configurable hardware module 12.

In a further act S3, the execution environment 13 of the configurable hardware module 12 that executes the hardware-application component 14 in the respective execution environment 13 is analyzed by the instantiated hardware-application component 14, where the hardware application component 14 communicates with a characterizing unit 24, 25, 26 providing characterizing parameters for the execution environment 13 of the configurable hardware module 12.

In a further act S4, the analyzed execution environment 13 of the configurable hardware module 12 is verified as admissible for execution of the hardware-application component 14 if the analyzed execution environment 13 matches the characterizing parameters provided by the characterizing unit 24, 25, 26.

In a further embodiment, the analyzed execution environment 13 of the configurable hardware module 12 is verified as admissible for execution of the hardware-application component 14 if a reference value of the analyzed execution environment 13 is calculated (e.g., during a provisioning phase or first execution, matches the characterizing parameters provided by the characterizing unit 24, 25, 26).

The hardware-application component 14 is an instantiation of the hardware-application 16 in the execution environment 13 of the configurable hardware module 12. The hardware-application component 14 may verify in which hardware (e.g., in which FPGA) the hardware-application component 14 is executed. For example, a hardware-application component 14 may verity in which execution environment (e.g., a reconfiguration region or a partial reconfiguration region of the reconfiguration region of the configurable hardware module 12) the hardware-application component 14 is executed.

In summary, the present embodiments relate to a method for verifying an execution environment 13 provided by a configurable hardware module 12, where the execution environment 13 in the configurable hardware module 12 is used for execution of at least one hardware-application 16. In a first act S1, a hardware-application 16 is received by the configurable hardware module 12. The hardware-application 16 includes configuration data describing an instantiation as a hardware-application component 14 on the configurable hardware module 12. In a further act S2, a received hardware-application 16 is instantiated as the hardware-application component 14 in the execution environment 13 of the configurable hardware module 12. In a further act S3, the execution environment 13 of the configurable hardware module 12 that executes the hardware-application component 14 in the respective execution environment 13 is analyzed by an instantiated hardware-application component 14. The hardware application component 14 communicates with a characterizing unit 24, 25, 26 providing characterizing parameters for the execution environment 13 of the configurable hardware module 12. In a further act S4, the analyzed execution environment 13 of the configurable hardware module 12 is verified as admissible for execution of the hardware-application component 14 if a reference value of the analyzed execution environment 13 matches the characterizing parameters provided by the characterizing unit 24, 25, 26. Due to the present embodiments, a hardware-application component may verify in which configurable hardware module or in which execution environment of the configurable hardware module the hardware-application component is executed.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for verifying an execution environment provided by a configurable hardware module, wherein the execution environment in the configurable hardware module is used for execution of at least one hardware-application, the method comprising:

receiving, by the configurable hardware module, the hardware-application, wherein the hardware-application comprises configuration data describing an instantiation as a hardware-application component on the configurable hardware module;

instantiating the received hardware-application as the hardware-application component in the execution environment of the configurable hardware module;

analyzing, by the instantiated hardware-application component, the execution environment of the configurable hardware module that executes the hardware-application component in the respective execution environment, wherein the hardware application component communicates with a characterizing unit providing characterizing parameters for the execution environment of the configurable hardware module; and verifying the analyzed execution environment of the configurable hardware module as admissible for execution of the hardware-application component when the analyzed execution environment matches the characterizing parameters provided by the characterizing unit, wherein the hardware-application component changes into a hardware operation mode when the analyzed execution environment does not match the characterizing parameters provided by the characterizing unit, the hardware operation mode comprising:

changing the hardware operation mode of the hardware-application component into error modus, debugging modus, or error modus and debugging modus; and repeating the verifying.

2. The method of claim 1, wherein further comprises:
limiting functionality of the hardware-application component; or
deactivating the functionality of the hardware-application component.

3. The method of claim 2, wherein the characterizing unit comprises characterizing parameters specifying the reconfiguration region of the configurable hardware module.

4. The method of claim 3, wherein the characterizing unit is included in the configurable hardware module.

5. The method of claim 2, wherein the characterizing unit comprises characterizing parameters specifying at least one partial reconfiguration region of the reconfiguration region of the configurable hardware module.

6. The method of claim 5, wherein the characterizing unit is included in the hardware-application component.

7. The method of claim 1, wherein the execution environment of the configurable hardware module comprises a reconfiguration region of a configurable hardware module, at least one partial reconfiguration region of the reconfiguration region of the configurable hardware module, or a combination thereof.

8. The method of claim 1, wherein the configurable hardware module comprises a field programmable gate array, an application specific integrated circuit, or an application specific standard product.

9. The method of claim 1, wherein the characterizing unit comprises a physical unclonable function, a ring oscillator, or a ring oscillator-physical unclonable function.

10. The method of claim 9, wherein the characterizing parameter comprises a reference-value used for calculating a hamming-distance of changing bits.

11. The method of claim 10, wherein the reference-value is encrypted or signed with a hardware-application component specific key by the hardware-application component.

12. The method of claim 9, wherein the characterizing parameter comprises a reference-value including bits with a defined stable or instable state.

13. The method of claim 9, wherein the characterizing parameter comprises a challenge-response-list.

14. The method of claim 9, wherein the characterizing parameter comprises an encrypted key generated by the hardware-application component.

15. An apparatus for verifying an execution environment provided by a configurable hardware module, wherein the execution environment in the configurable hardware module is used for execution of at least one hardware-application, the apparatus comprising:

a processing unit configured to:

provide the hardware-application, wherein the hardware-application comprises configuration data describing the instantiation as a hardware-application component on the configurable hardware module;

instantiate a provided hardware-application as the hardware-application component in the execution environment of the configurable hardware module;

receive a result from analysis of the execution environment of the configurable hardware module that executes the hardware-application component processed by an instantiated hardware-application component, wherein the hardware-application component is in communication with a characterizing unit providing characterizing parameters for the execution environment of the configurable hardware module; and verify the analyzed execution environment of the configurable hardware module as admissible for execution of the hardware-application component based on a received result when the analyzed execution environment matches the characterizing parameters provided by the characterizing unit, wherein the hardware-application component is configured to change into a hardware operation mode when the analyzed execution environment does not match the characterizing parameters provided by the characterizing unit, the hardware operation mode comprising:

change of the hardware operation mode of the hardware-application component into error modus, debugging modus, or error modus and debugging modus;

and repetition of the verification.

* * * * *

UNITED STATES PATENT AND TRADEMARK OFFICE
CERTIFICATE OF CORRECTION

Page 1 of 1

PATENT NO. : 11,783,039 B2
APPLICATION NO. : 17/438618
DATED : October 10, 2023
INVENTOR(S) : Hans Aschauer et al.

It is certified that error appears in the above-identified patent and that said Letters Patent is hereby corrected as shown below:

In the Claims

Claim 2; (Line 37):
"The method of claim 1, wherein further comprises:"
Should be replaced with:
"The method of claim 1, wherein the hardware operation mode further comprises:"

Signed and Sealed this
Thirteenth Day of January, 2026

John A. Squires
*Director of the United States Patent and Trademark Office*